(12) United States Patent
Ebata

(10) Patent No.: US 6,494,574 B2
(45) Date of Patent: Dec. 17, 2002

(54) EYEGLASSES HAVING SCREWLESS HINGES

(75) Inventor: Kenji Ebata, Kodaira (JP)

(73) Assignees: Nikon Eyewear Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 10/028,268

(22) Filed: Dec. 28, 2001

(65) Prior Publication Data

US 2002/0054272 A1 May 9, 2002

Related U.S. Application Data

(63) Continuation of application No. PCT/JP00/06517, filed on Sep. 22, 2000.

(51) Int. Cl.[7] .................................................. G02C 5/22
(52) U.S. Cl. ........................................ 351/153; 16/228
(58) Field of Search ................................ 351/153, 121, 351/113, 114; 16/228

(56) References Cited

U.S. PATENT DOCUMENTS 5,732,444 A * 3/1998 Horikawa et al. .......... 351/153
5,894,336 A * 4/1999 Baldissarutti ............... 351/153

FOREIGN PATENT DOCUMENTS

| JP | 7-23320 | 4/1995 |
|---|---|---|
| JP | 8-50264 | 2/1996 |
| JP | 8-68973 | 3/1996 |
| JP | 10-20260 | 1/1998 |
| JP | 11-142794 | 5/1999 |
| JP | 11-337883 | 12/1999 |
| JP | 2000-10053 | 1/2000 |

* cited by examiner

Primary Examiner—Huy Mai
(74) Attorney, Agent, or Firm—Miles & Stockbridge P.C.

(57) ABSTRACT

Disclosed is eyeglasses having hinges each comprising a coupling member formed of wire material, having a curved portion at one end thereof and being secured to a lens or a rim at the other end, and a fit member which is provided at one end of a temple and is fitted between wire materials of the curved portion to be rotatable, wherein the coupling member is fitted in a groove formed in the circumferential direction of the fit member and the coupling member and the fit member are brought into contact at least at two points.

3 Claims, 6 Drawing Sheets

EYEGLASSES HAVING SCREWLESS HINGES

CROSS-REFERENCE TO RELATED APPLICATION

This is a continuation of International Application No. PCT/JP00/06517 filed Sep. 22, 2000 (not yet published under PCT Article 21(2)).

TECHINICAL FIELD

The present invention relates to a screwless hinge of an eyeglass frame.

BACKGROUND ART

As hinges for eyeglasses, there are proposed those described in the following.

The Japanese Utility Model Application Laid-Open No. 7-23320 proposes a hinge in which a fit member 34 formed of metallic wire materials at the tip end of a temple is in planar or linear contact with a spherical, columnar or disc-like coupling member 31 having an annular groove.

FIG. 3 shows an example in which the coupling member 31 provided on a wire material 32 on the rim side takes a columnar form. The Coupling member 31 is secured by the wire material 32 passed through the center of the column.

A groove 33 is formed on the coupling member 31 in the circumferential direction about an approximate center in the direction of thickness of the coupling member 31. The fit member 34 is fitted in this groove 33 to be rotatable and the temple is folded or unfolded upon rotation of the fit member 34. Then, a stopper 35 is provided by bending the tip end of the wire material 32 for limiting this rotation so as to prevent the temple from being unfolded too wide.

The Japanese Patent Application Laid-Open No. 8-50264 discloses a hinge which is entirely formed of linear members (see FIGS. 4A to 4C).

In this case, as shown in FIG. 4A, the hinge is entirely formed of wire materials, and one end of a coupling member 41 which is provided on the rim side has an annular structure. On one end of a temple 43, there is formed a support member 44 which is to be attached to the annular portion of the coupling member 41 to be rotatable.

FIG. 4B is a schematic view for showing an eyeglass frame, seen from the lateral side, in a state in which the support member 44 is attached to the coupling member 41. FIG. 4C is a view showing this state seen from above.

In a state in which the temple 43 is completely unfolded, a part of the annular part of the coupling member 41 serves as a stopper 42, so as to limit an unfolding movement of the temple 43.

A hinge disclosed in the Japanese Patent Application Laid-Open No. 10-20260 comprises, as shown in FIGS. 5A and 5B, comprises a bracket 51 which is obtained by dividing a wire material serving as the coupling member into upper and lower parts. One end of the bracket 51 is secured to a rim 52. The other end of the bracket 51 is in an annular structure when the eyeglass frame is seen from above. In addition, one end of a temple 53 is also in an annular structure, and a cylindrical fit member 54 is secured to the inner side of this annular portion.

The wire material for forming the annular structure of the temple 53 is coupled between the two wire materials of the bracket 51 to be rotatable around the fit member 54.

The fit member 54 is provided with a stopper 55 for limiting folding and unfolding movements of the temple 53.

The folding or unfolding movement of the temple 53 is stopped at a position at which this stopper 55 is brought into contact with the bracket 51 in the folding and unfolding movements.

FIG. 5B is a view for schematically showing the bracket 51 and the fit member 53 removed off from the frame.

The screwless hinges disclosed in the above-described prior arts have their own problems.

The hinge disclosed in the Japanese Utility Model Application Laid-Open No. 7-23320 (see FIG. 3) is in a state in which the stopper 35 for limiting rotation is protruded outward from the eyeglass frame, which does not render an attractive appearance. Further, there arises a problem that the stopper 35 may catch clothes or the like. Further, in this structure, it is difficult to position the stopper 35, and there may arise problems that the right and left temples are unfolded in different amounts, and that the initial angle can not be maintained in the course of use owing to deformation, or the like, of the stopper 35. Furthermore, the coupling member 31 and the fit member 34 are in linear contact, which brings about a problem that the groove 33 of the coupling member 31 is abraded by friction.

A hole of the support member 44 of the hinge disclosed in the Japanese Patent Application Laid-Open No. 8-50264 (see FIGS. 4A to 4C) is a so-called clearance hole, and the resisting force in rotation in this case is caused only by a friction due to plane contact with the coupling member 41, which may make the folding and unfolding movements unstable.

When the temple 43 is to be attached to the frame, an unnecessary force may be applied on the coupling member 41. Thus, an unstable contact of the contact surface (a so-called one-side contact) may be brought about due to deformation or the like of the coupling member 41. Further, this hinge is formed only of wire materials, so that the coupling position of the temple 43 may be displaced downward by the weight of the temple 43 itself.

Furthermore, in case of the hinge disclosed in the Japanese Patent Application Laid-Open No. 10-20260 (see FIGS. 5A and 5B), in order to bring the wire material having the annular structure of the bracket 51 into linear contact with the fit member 54, it is required to align the both members to each other in such a manner that the both members should be rubbed uniformly. Accordingly, it is naturally expected that an area of contact becomes large and a smooth sliding movement is gradually difficult to be obtained with the elapse of time. Then, these conventional screwless hinges have the common problem that the contact area at the fit portion in each of the hinges is large so as to cause a problematic friction between the members upon folding and unfolding movements of the hinge. Then, there is another problem of the degraded rotational torque performance which is caused by deterioration due to this friction. Further, there is also a problem of difficulty to obtain a high precision in working the fit member due to an area of contact between the coupling member and the fit member at the fitting time.

DISCLOSURE OF THE INVENTION

The present inventors have found that the above problems can be solved by improving the form of a coupling member to be secured to the rim and a method of contact with a temple to be coupled to this temple.

According to a first aspect of the present invention, there is provided eyeglasses provided with hinges each comprising:

(a) a pair of lenses; and
(b) a coupling member formed of wire material, having a curved portion at one end thereof and being secured to the lens or a rim at the other end, and a fit member provided at one end of a temple, wherein the fit member has a circumferential groove and the curved portion is fitted in the groove to be rotatable, and the coupling member and the fit member are brought into contact with each other at least at two points.

It is preferable that, in these eyeglasses, an area of contact between the coupling member and the fit member at the above contact points is not more than two thirds as large as the circumference of the groove.

According to a second aspect of the present invention, there is provided an eyeglass frame with hinges each comprising:

a coupling member formed of wire material and having a curved portion at one end thereof and being secured to a lens or a rim at the other end; and a fit member provided at one end of a temple, wherein the fit member has a circumferential groove and the curved portion is fitted in the groove to be rotatable, and the coupling member and the fit member are brought into contact with each other at least at two points.

It is preferable that, in this eyeglass frame, an area of contact between the coupling member and the fit member at the above contact points is not more than two thirds as large as the circumference of the groove.

According to a third aspect of the present invention, there is provided a hinge comprising:

a coupling member formed of wire material and having a curved portion at one end thereof and being secured to a lens or a rim at thee other end; and a fit member provided at one end of a temple, wherein the fit member has a circumferential groove and the curved portion is fitted in the groove to be rotatable, and the coupling member and the fit member are brought into contact with each other at least at two points.

It is preferable that, in this hinge, an area of contact between the coupling member and the fit member at the contact points is not more than two thirds as large as the circumference of the groove.

THE PREFERRED EMBODIMENTS

Figure 6:
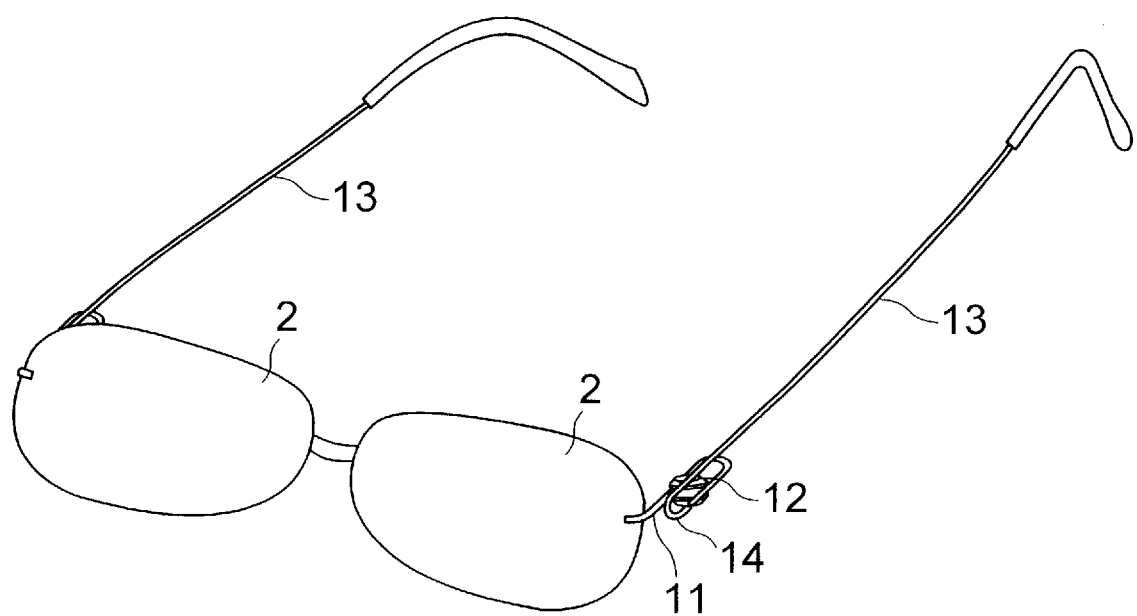
FIG. 6 is a schematic perspective view of eyeglasses having screwless hinges according to the present invention.

FIG. 6 is a schematic perspective view of eyeglasses having screwless hinges according to the present invention, while FIGS. 1A to 1E show one embodiment of a hinge according to the present invention. As shown in these drawings, the hinge of he present invention comprises a coupling member 11 and a fit member 12.

Figure 1A:
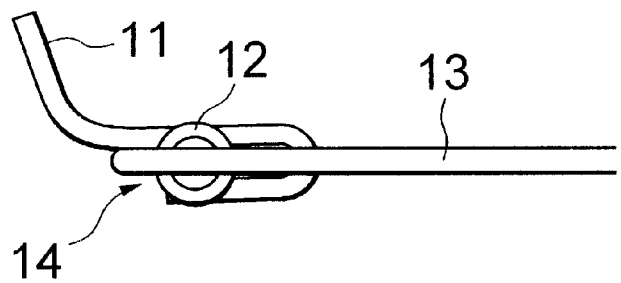
FIGS. 1A to 1E represent top views for schematically showing a hinge portion of eyeglasses having a screwless hinge according to the present invention.

FIG. 1A is a schematic view for showing an eyeglass frame, seen from above, in a state in which the coupling member 11 and the fit member 12 are fitted to each other (in a state in which the temples 13 are unfolded).

The coupling member 11 is formed of wire material, with one end secured to a rim or a lens 2. The wire material for forming the coupling member 11 of the present invention has a rod-like form such as a wire, and a cross section thereof may take a circular form or a prismatic form, or may take any other form. As a material for the coupling member 11, stainless steel, titanium, cobalt, copper, nickel, zinc, alluminium, chromium, iron, gold, silver, or the like, may be used. Theses materials may be used solely or in a state of alloy. When titanium alloy is used, zirconium or vanadium is preferably added. Further, apart from the above metals, plastics may also be used.

As desirable dimensions, the diameter of the wire material is preferably about 0.3 mm to 3 mm. However, such dimensions may depend upon the design of an eyeglass frame, and not limited to the above.

The other end of the coupling member 11 is fitted in the fit member 12 secured to one end of the temple to be rotatable, thereby achieving folding and unfolding movements of the temple 13.

Figure 1B:
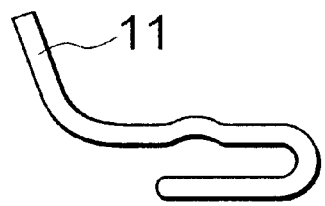

The coupling member 11 takes, when the eyeglass frame is seen from above, a curved form, as shown in FIG. 1B. This curved form is preferably an appropriate U shape, but is not necessarily required to be a complete U shape. For instance, the curved parts of the U shape may be formed square or the U shape may have a step along the width thereof. The distance between the separated parts of the wire material for forming the U shape is not particularly limited, but may be set to be wider than those shown in FIGS. 1A to 1E.

Figure 1C:
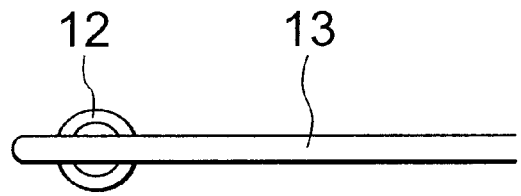
Figure 1D:
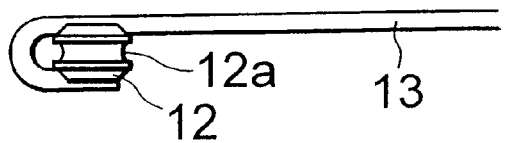
Figure 1E:
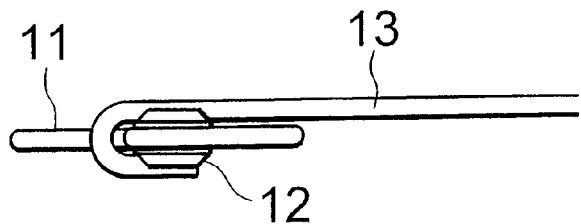

As shown in FIGS. 1C and 1D, the coupling member 12 according to the present invention preferably takes an approximately conical form, or an approximately disc-shaped form, or an approximately spherical form. As shown in FIG. 1D, a groove 12a is formed in the circumferential direction about an approximate center in the direction of thickness of the fit member 12. Then, as shown in FIG. 1E, the inner side of the curved portion of the coupling member 11 is fitted in this circumferential groove 12a to be rotatable.

It is preferable that, as shown in FIGS. 1C and 1D, the fit member 12 fits the coupling member 11 in the circumferential groove so as to sandwich the coupling member from the upper and lower parts thereof to be coupled. However, a manner of coupling is not limited to this. It is suffice if either upper or lower part of the fit member 12 is arranged to be secured to one end of the temple 13.

It is also preferable that a stopper 14 (see FIG. 1A) for limiting an unfolding movement of the temple 13 is disposed at one end of the fit member 12 or the temple 13. In the present embodiment, one end of the temple 13 also serves as the stopper 14 (see FIG. 1A). As described above, when either one of the upper and lower parts of the fit member 12 is secured to one end of the temple 13, the tip end of the temple 13 may be formed as L-shaped or J-shaped so as to serve as the stopper.

The fit member 12 is preferably secured to the temple 13 by welding.

Then, it is important that, in the hinge of the present invention, the coupling member 11 and the fit member 12 are brought into contact with each other at least at two points and in a rotatable condition.

Figure 3:
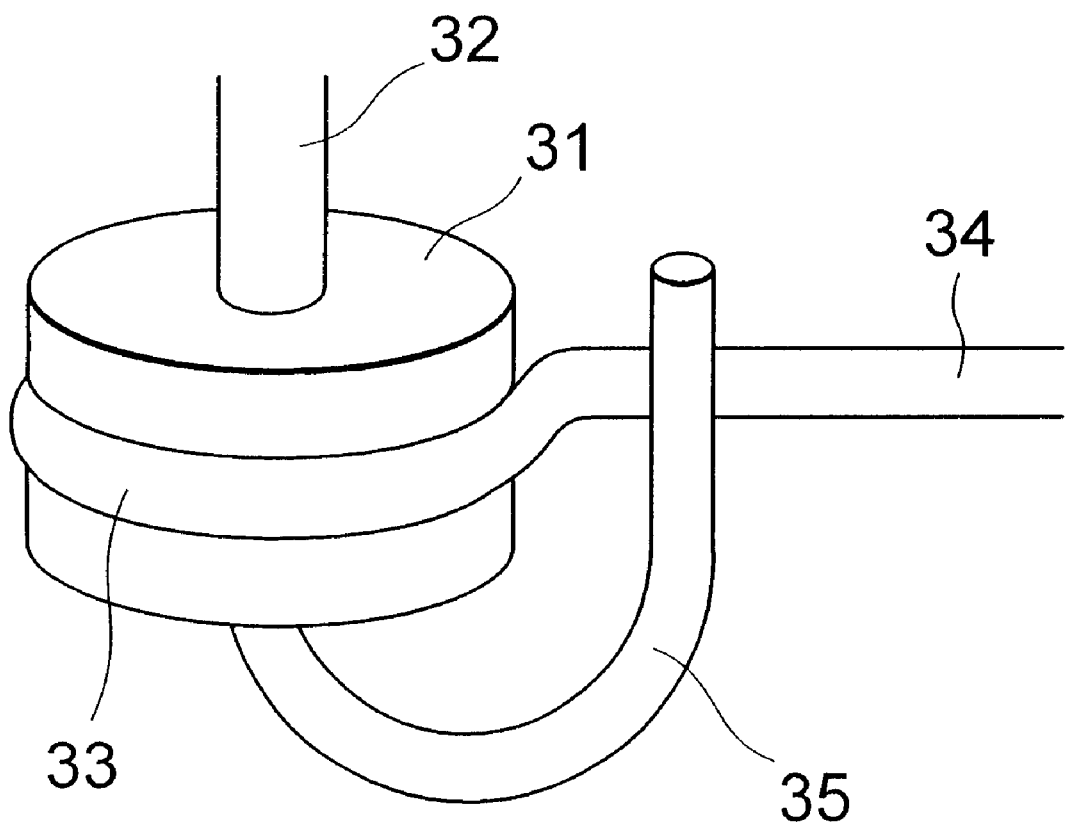
FIG. 3 is a schematic view of a conventional screwless hinge.
Figure 4A:
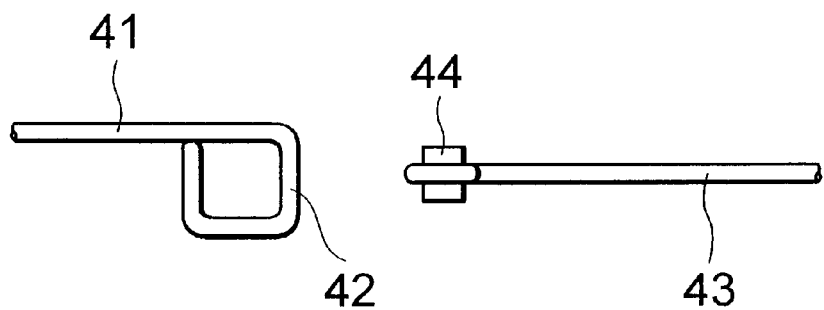
FIGS. 4A to 4C represent schematic views of another conventional screwless hinge.
Figure 4B:
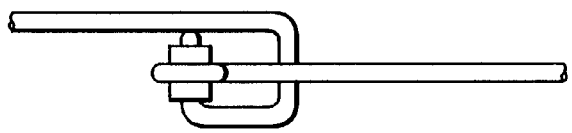
Figure 4C:
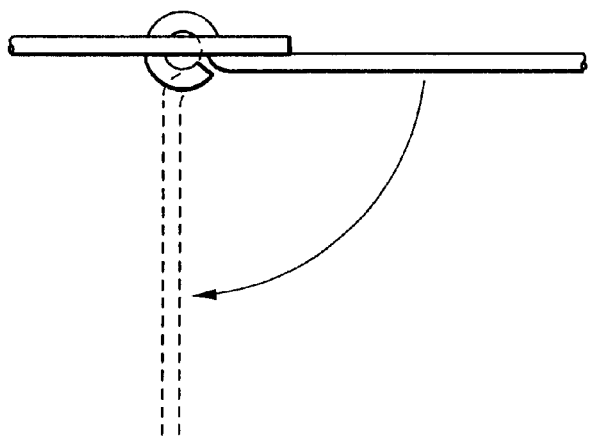
Figure 5A:
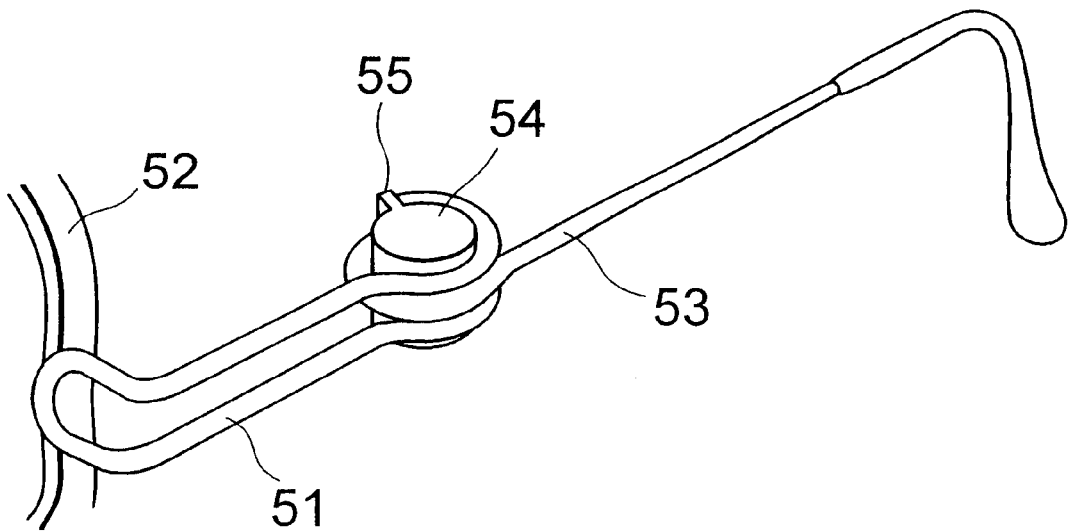
FIGS. 5A and 5B represent schematic views of still another conventional screwless hinge.
Figure 5B:
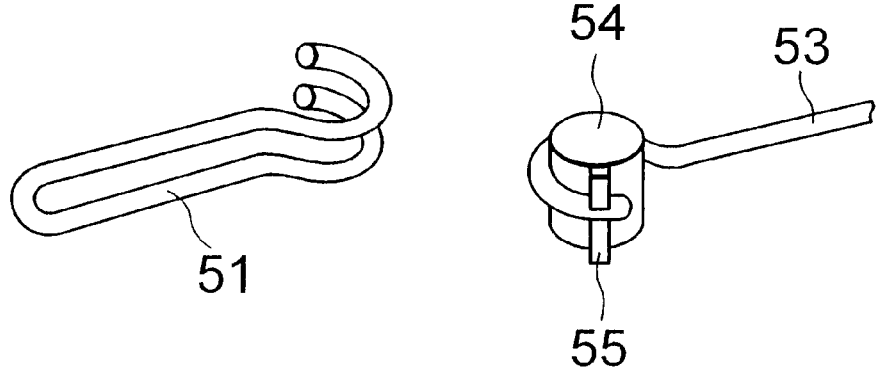

For instance, in a case shown in FIG. 3 which is conventionally proposed, a coupling member 31 and a fit member 34 are in contact at one point. For this reason, unless an area of contact between the two members exceeds a half of the circumference of the coupling member 31, it is impossible to fit the both members to each other in a rotatable condition (in reality, unless the area of contact is considerably larger than a half of the circumference, a stable fitting can not be attained). In other words, in case the both members are in contact at one point to be fitted to each other, it is impossible to fit the both members to each other in a rotatable condition unless an area of contact is sufficiently large. To this end, the area of contact between the both members becomes large and deterioration caused by abrasion in the area of contact becomes conspicuous.

However, according to the present invention, since the coupling member and the fit member are in contact at least at two points, it is possible to realize an excellent fitting with a small area of contact. Thus, according to the present invention, though the number of contact points is greater than that of the prior art, the total area of contact becomes smaller, thereby suppressing the deterioration due to abrasion caused by the friction between the two members.

However, it is not preferable that the area of contact between the both members is increased due to an increase of the number of the contact points. If the area of contact is too large, the significance of setting two or more contact points between the both members becomes thin. Therefore, it is most preferable that the both members are brought into point-contact to be fitted to each other. This point contact requires the smallest area of contact so as to reduce the adverse influence of friction to the minimum. Such a state obtained by this point contact can not be realized by a conventional hinge which has one contact point between a coupling member and a fit member.

Taking the adverse influence caused by friction mentioned above into consideration, according to the present invention, it is preferable that the coupling member 11 and the fit member 12 are brought into contact with each other in an area of not more than two thirds as large as the circumference of the fit member 12. It is envisaged that the influence of friction becomes undesirably great if the area of contact exceeds this. However, the both members are not always brought into contact with each other in an arrangement having two or more points of contact, as in the present invention. Thus, in such an arrangement, the size of the contact area is not particularly limited.

Figure 2A:
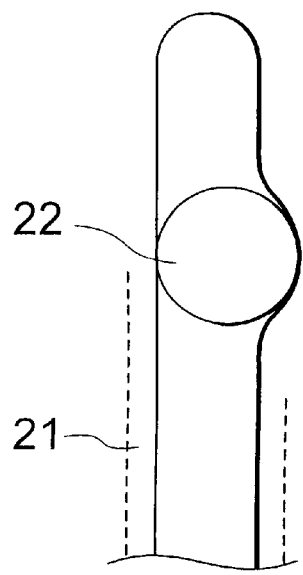
FIGS. 2A to 2C represent schematic views for showing an example of a fitting state between a coupling member and a fit member of the hinge according to the present invention.
Figure 2B:
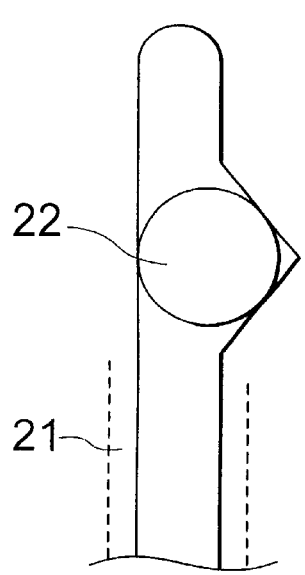
Figure 2C:
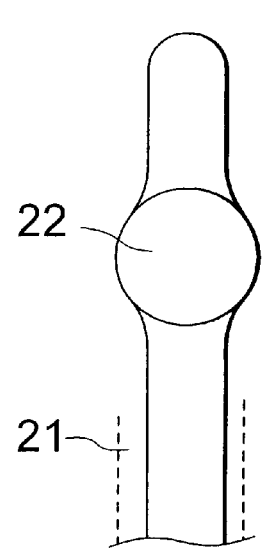

FIGS. 2A to 2C are views of an eyeglass frame seen from above for schematically showing examples of a fitting method between a coupling member 21 and a fit member 22 of a hinge according to the present invention.

In the drawings, a reference numeral 21 denotes a coupling member, and 22 denotes a fit member. An area of the fit member 22 with which the coupling member 21 is in contact is a groove formed on the fit member 22.

In the example shown in FIG. 2A, a recess is formed to be corresponding to the curvature of the fit member 22 on one of the wire materials of the coupling member 21 to be fitted to the fit member 22, at which the coupling member 21 is fitted into the fit member 22. No recess is formed in an area with which the fit member 22 is to be in contact on the other wire material.

FIG. 2A shows an arrangement in which there are two points of contact, one of which is for a point contact, thereby reducing the adverse influence caused by friction.

Also, FIG. 2B shows an arrangement in which a recess is formed to fit the fit member 22 in one of the wire materials. However, unlike in the example shown in FIG. 2A, this recess is a linear one. No recess is formed on the other wire material, like in FIG. 2A. Accordingly, this arrangement shows a state in which three points are completely brought into point contact, thereby reducing the adverse influence of friction most conspicuously.

Furthermore, FIG. 2C shows an arrangement in which recesses each having the same curvature as that of the fit member 22 are formed on the both wire materials. In this case, there is no point at which the coupling member 21 and the fit member 22 are brought into point contact. However, an area of contact between the both members is about a half as large as the circumference of the fit member 22. When the coupling member and the fit member are brought into contact at one point, like in the conventional example, it is impossible to fit the both members to each other on a condition that an area of contact between the both members is a half of the circumference of the fit member. However, according to the present invention, as shown in FIG. 2C, it is possible to satisfactorily fit the both members to each other even in an area of contact of a half as large as the circumference of the fit member, in which the adverse influence caused by friction is a little.

It is preferable that a portion of the coupling member in which the fit member is fitted (between the wire materials formed substantially in parallel to each other) has spring, whereby the fitting between the coupling member and the fit member becomes more secured.

According to the present invention, the following effects can be obtained.

1) Since there are at least two points of contact between the coupling member and the fit member in the screwless hinge of the present invention, an area of contact is required to be smaller than that of a screwless hinge of the prior art which has only one point of contact, so that the adverse influence caused by friction can be reduced. For this reason, it is possible to stabilize folding and unfolding movements of the temples for a long time to thereby prolong the life of the eyeglass frame.

2) Since the number of points of contact between the coupling member and the fit member in the screwless hinge of the present invention is smaller than that of the screwless hinges of the prior art, it is possible to manufacture the hinge of the present invention without requiring a high working precision to obtain a finer surface therefor. Thus, it is possible to manufacture an eyeglass frame having such a screwless hinge easily at a low cost, compared with that of the prior art.

3) It is possible to realize fitting with a predetermined pressure more stably all the time, compared with that of the prior art, if bearing the fit member by the use of the spring of the coupling member.

What is claimed is:

1. Eyeglasses having a pair of lenses and provided with hinges each comprising:

a coupling member formed of wire material, having a curved portion at one end thereof and being secured to a lens or a rim at the other end; and a fit member provided at one end of a temple, wherein said fit member has a circumferential groove and said curved portion is fitted in said groove to be rotatable, and said coupling member and said fit member are brought into contact with each other at least at two points, and wherein an area of contact between said coupling member and said fit member at said contact points is not more than two thirds as large as the circumference of said groove.

2. An eyeglass frame having hinges each comprising:

a coupling member formed of wire material and having a curved portion at one end thereof and being secured to a lens or a rim at the other end; and a fit member provided at one end of a temple, wherein said fit member has a circumferential groove and said curved portion is fitted in said groove to be rotatable, and said coupling member and said fit member are brought into contact with each other at least at two points, and wherein an area of contact between said coupling member and said fit member at said contact points is not more than two thirds as large as the circumference of said groove.

3. A hinge for eyeglasses comprising:

a coupling member formed of wire material and having a curved portion at one end thereof and being secured to a lens or a rim at the other end; and a fit member provided at one end of a temple, wherein said fit member has a circumferential groove and said curved portion is fitted in said groove to be rotatable, and said coupling member and said fit member are brought into contact with each other at least at two points, and wherein an area of contact between said coupling member and said fit member at said contact points is not more than two thirds or around as large as the circumference of said groove.

* * * * *